(12) United States Patent
Possidento

(10) Patent No.: US 6,361,324 B1
(45) Date of Patent: Mar. 26, 2002

(54) TETRAHEDRAL TWIST: CHEMISTRY PUZZLE AND TEACHING DEVICE

(76) Inventor: William Possidento, 83 Colony Ave., Park Ridge, NJ (US) 07656-1048

( * ) Notice: Subject to any disclaimer, the term of this patent is extended or adjusted under 35 U.S.C. 154(b) by 0 days.

(21) Appl. No.: 09/729,161

(22) Filed: Dec. 5, 2000

(51) Int. Cl.⁷ .................................................. G09B 23/24
(52) U.S. Cl. ................ 434/282; 273/153 R; 273/153 S
(58) Field of Search ................................. 434/276, 277, 434/281–282, 283, 298, 403, 406, 428, 128; 116/200–337

(56) References Cited

U.S. PATENT DOCUMENTS

| | | | | |
|---|---|---|---|---|
| 3,594,923 A | * | 7/1971 | Midgley | |
| 3,608,906 A | * | 9/1971 | Odier | |
| 3,724,098 A | * | 4/1973 | McSmith | |
| 4,040,191 A | * | 8/1977 | Quarrie | |
| 4,199,876 A | * | 4/1980 | Katz | |
| 4,415,158 A | * | 11/1983 | Engel | |
| 4,558,866 A | * | 12/1985 | Alford | |
| D396,060 S | * | 7/1998 | Gilbride | |

* cited by examiner

Primary Examiner—Jacob K. Ackun, Jr.
Assistant Examiner—Dmitry Suhol
(74) Attorney, Agent, or Firm—John P. Halvonik

(57) ABSTRACT

A twisting three dimensional puzzle apparatus for the study of chemistry and its history and based upon the Zmaczynski equilateral triangular model of the periodic table of the chemical elements. Each face of the pyramid has a series of equilateral shaped portions bearing portions of the periodic table of elements. The different segments can be rotated around in order to scramble the puzzle. Such portions can be constructed using same or similar technology that was used to design the Meffert PYRAMINX PUZZLE that is similar to the RUBIK'S CUBE design.

1 Claim, 3 Drawing Sheets

TETRAHEDRAL TWIST: CHEMISTRY PUZZLE AND TEACHING DEVICE

FIELD AND BACKGROUND OF THE INVENTION

The invention relates to the field of teaching devices and, in particular, to a puzzle based upon the periodic table of the chemical elements which involves a series of triangular shaped portions that are fitted together to make a pyramidal shaped puzzle. The object of the puzzle being to initially scramble the different segments by rotations of these sections and then to return them to their original positions using the information contained on the portions Each of puzzle portions on a single face contain portions of the periodic table displayed in the triangular representation known as the Zmaczynski representation. Such pieces or segments may be rotated around the puzzle using a design similar to the Rubik's Cube design or the Uwe Meffert design known as the Pyraminx.

The Meffert design differs from the Rubik's Cube in that latter is in the shape of cube and the former is in the shape of a tetrahedral pyramid. The Meffert design is shown in U.S. Pat. No. 5,358,247. It is this tetrahedral pyramidal shaped type of puzzle that is more relevant to this invention.

PRIOR ART

While there are three dimensional puzzles that are known in the prior art, none of them are based upon a triangular framework that represent the Zmaczynski display of the chemical elements. Nor are there known any chemistry puzzles that are based upon the Zmaczynski equilateral triangle representation of the periodic table of elements. While there are twisting puzzles, such as RUBIK'S CUBE (trademark name) whose goal is to return a series of surfaces to the original position (such as similar colored portions in RUBIK'S CUBE) there are none that are known to use such a twisting design as the basis for a chemistry puzzle; nor for that matter, a periodic chart of the elements.

SUMMARY OF THE INVENTION

A twisting puzzle apparatus for the study of chemistry and based upon the Zmaczynski equilateral triangular model of the periodic table of the chemical elements. The puzzle that is the subject of this application is in the form of a three dimensional pyramid having a series of equilateral shaped portions or segments that comprise each face of the pyramid. The pyramid is of the tetrahedral type having a triangular base and three surfaces in connection with this base. The different segments can be rotated around in order to scramble the puzzle. Such portions can be constructed using same or similar technology that was used to design the Meffert PYRAMINX PUZZLE that is similar to the RUBIK'S CUBE design.

Each of the puzzle sections contains a portion of the periodic table as represented by the Zmaczynski triangular representation of the periodic table. Preferably each surface of the pyramid would have 9 segments each in the shape of an equilateral triangular, with each segment having a portion of the periodic table. The object of the puzzle is to scramble the different segments up and to attempt to return the segments to their proper place so that a complete the periodic table will be presented on each of the faces when the puzzle is correctly finished. The segments belonging to any one surface may be color coded so that when the puzzle is completed all those segments on any given surface will all have the same color.

It is an object of the invention to provide a learning puzzle that is enjoyable to do and encourages students to recall and to understand those spatial relationships of the elements as depicted in the Zmaczynski equilateral triangle presentation of the periodic table.

Another object of the invention to provide a learning puzzle for allowing students to re-construct a periodic table displaying the elements in a triangular shape using a twist puzzle design that is the same or similar to the design of the RUBIK'S CUBE.

Another object of the invention to provide a learning puzzle to provide students with a triangular shaped version of the periodic table having portions of the table displayed on segments of the puzzle and to challenge them to re configure portions of the periodic table in the form of a twist puzzle and to return those portions to their original presentation in order to form a completed periodic table.

Other advantages will be seen by those skilled in the art once the invention is shown and described.

DESCRIPTION OF THE PREFERRED EMBODIMENT

Figure 3:
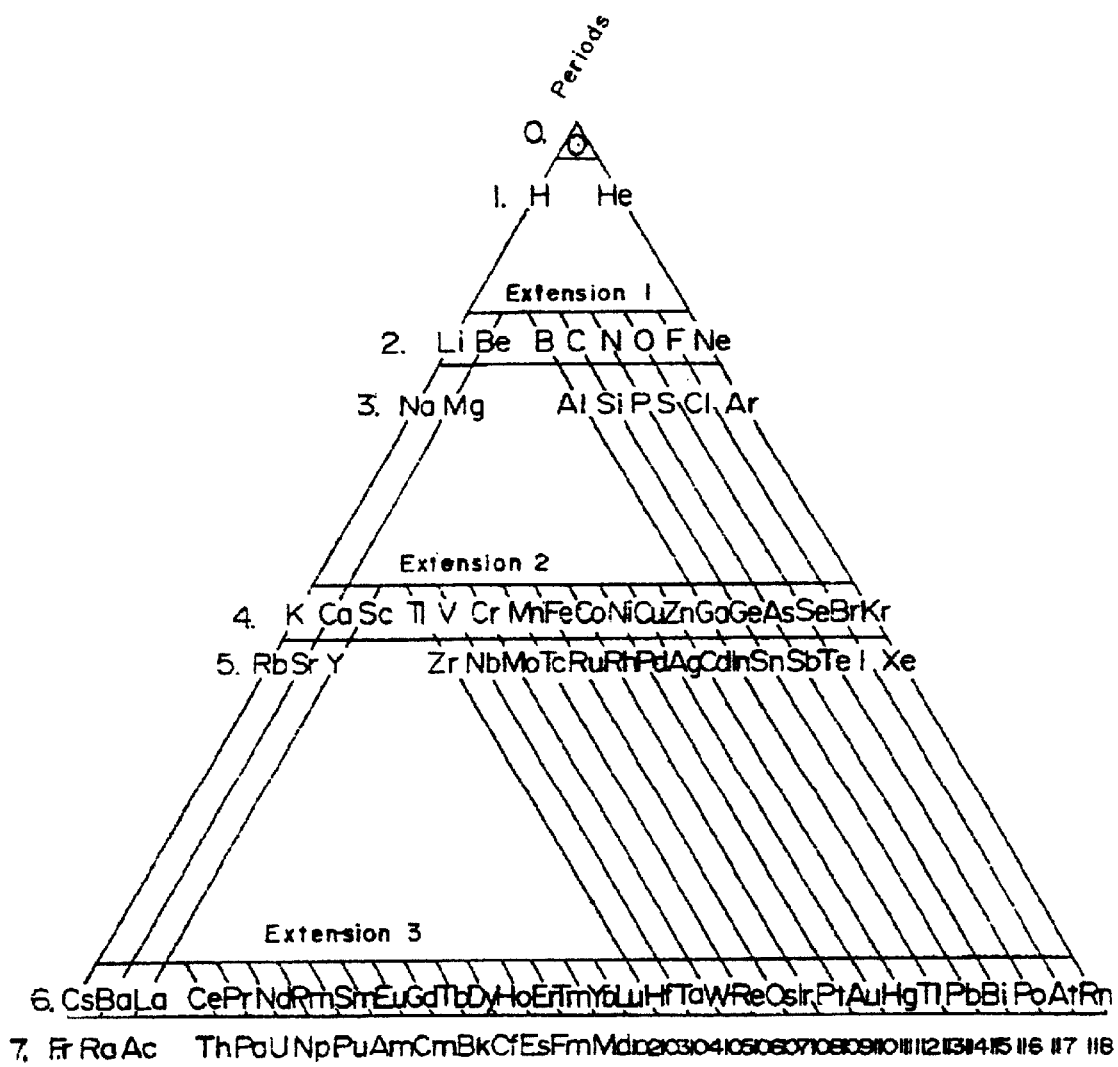
FIG. 3 Zmaczynski representation of the periodic table upon which the presentation of the puzzle segments is based.

The overall equilateral triangular periodic table that forms the basis for this puzzle is shown in FIG. 3. This triangular representation is attributed to the work of Zmaczynski and also to the work of Wagner and Booth and displays the elements starting with Helium in the upper corner of the triangle. The puzzle of this invention modifies the Zmaczynski presentation of the periodic table by putting two elements: Hydrogen and Helium, at the top of the triangular shaped display that will be present on every face of the pyramid. In contrast, the Zmaczynski representation only uses Hydrogen at the top of its display.

Each row of the triangle correspond to those rows in the standard periodic table (as well as Zmaczynski's) since those elements in any given row are believed to use the same electron shell when the final electrons are added to complete the electron shell of that element.

Figure 1:
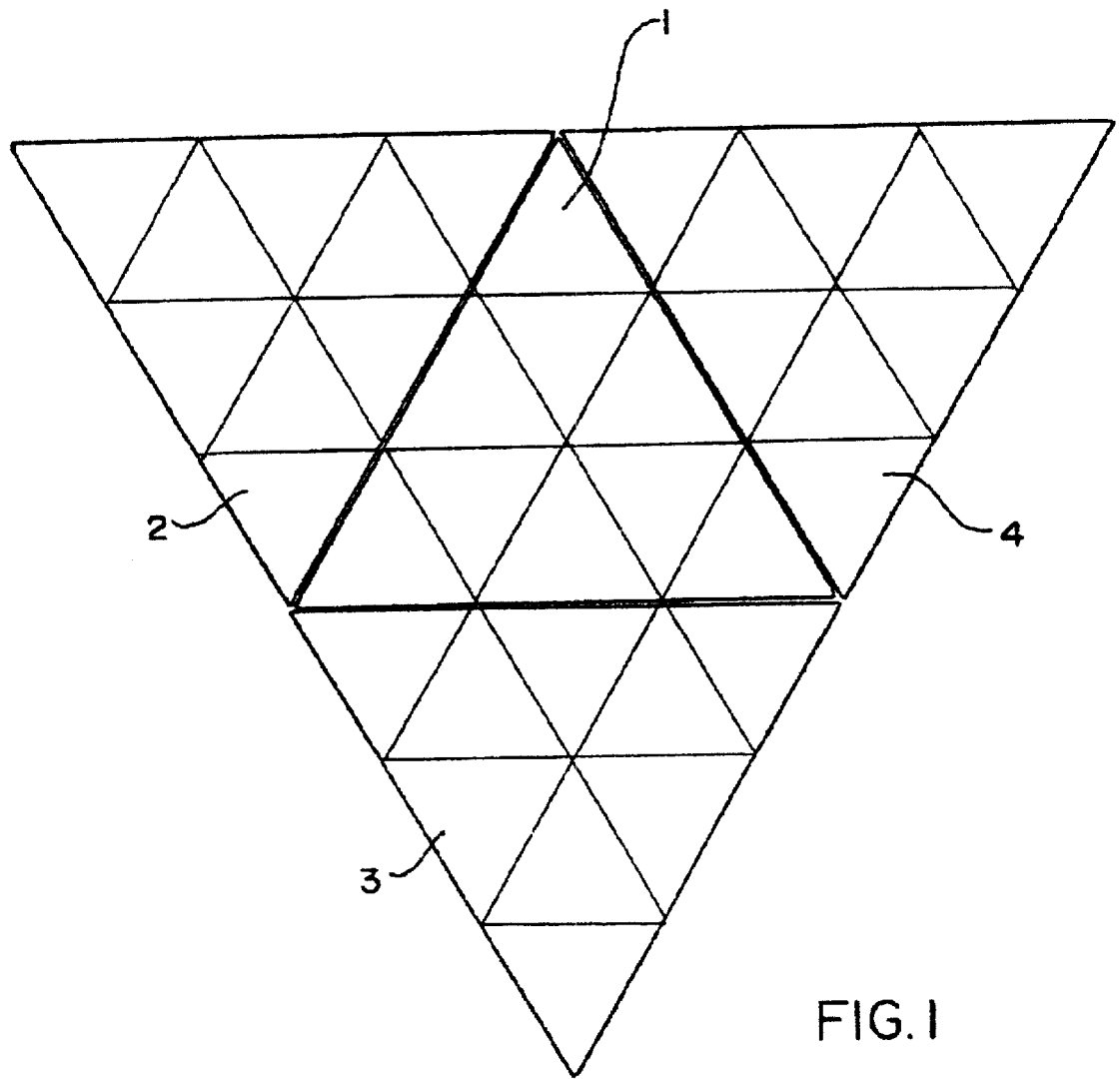
FIG. 1 representational view of the design of the invention showing all four faces of the design in one view.

A representational view of the overall design of the puzzle is shown in FIG. 1. This is not how the puzzle will look in reality but only to show the general concept behind the puzzle. Each of the faces, it will be noted, has the same periodic display; namely a periodic table displayed in an equilateral triangular shape.

Figure 2:
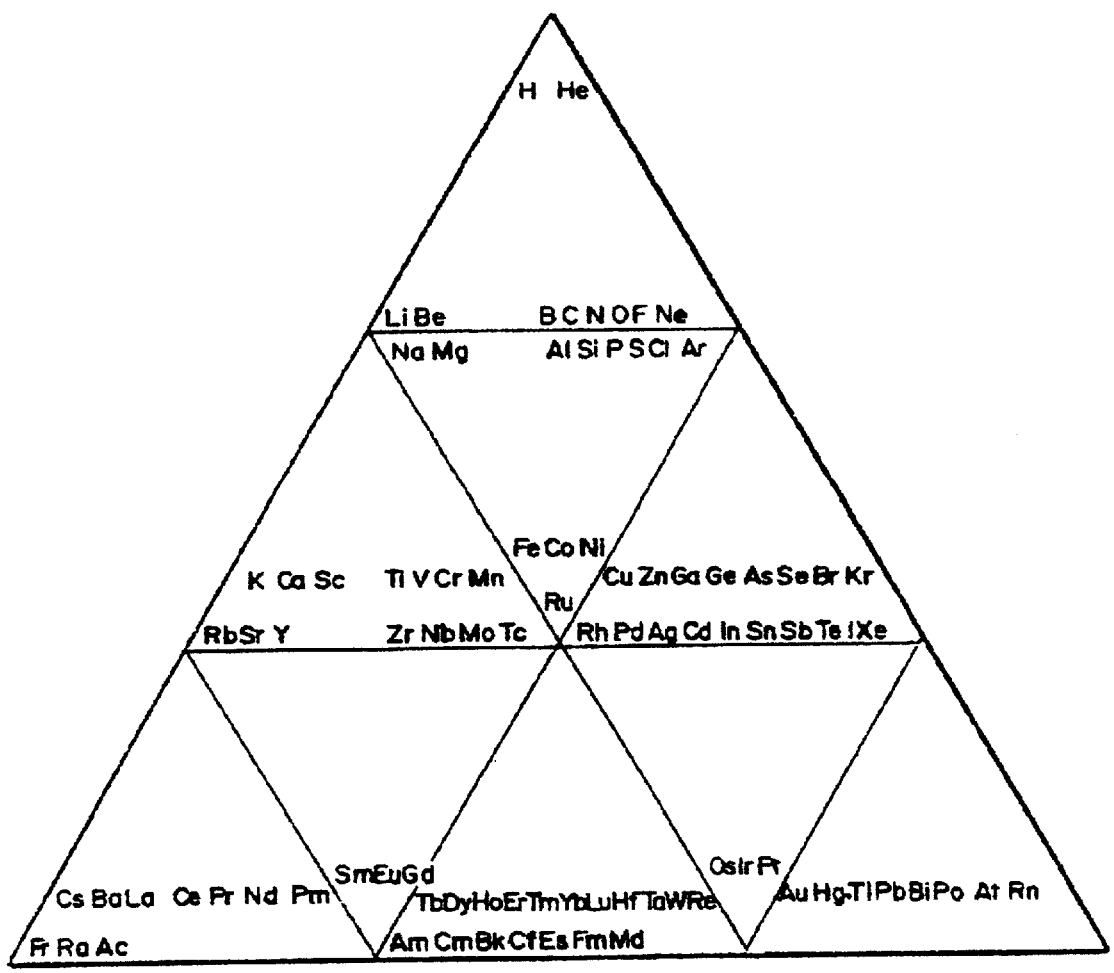
FIG. 2 view of twist puzzle, showing one surface or face of the puzzle.

A view of one face of the puzzle is shown in FIG. 2. Each surface or face is broken into 9 segments. Each of the segments displays a portion of the periodic table in the equilateral triangular shape previously referred to. Each of the segments is of equilateral triangular shape and they are all of the same size. The actual rotatable pieces of the puzzle correspond to segments on three faces. See description below.

For purposes of convenience, we may refer to the upper segment (at the top corner of the face) as segment I, with segments II, III and IV being in the next row below as we read from left to right and segments V through IX being in the bottom row, again reading from left to right.

As can be seen in FIG. 2; the first two rows of the table are displayed upon the segment I. Row three is displayed near the upper edge of the III segment. It doesn't matter how close this row of the table is to the edge, only that the first and last elements (Na and Ar, respectively) need to be fairly close to the two upper corners of this segment. Rows four and five of the table are displayed across the middle three segments (II through IV) of the face and finally rows 6 and 7 of the table are across the bottoms of segments V through IX.

Those pieces of the puzzle that bear the segments are rotatable or twistable in relation to one another using a construction the same as or similar to the Meffert design previously referred to (see "Background"). Thus, the smaller rotatable pieces each hold one segment on three different faces. Those segments at the corner of each face may be rotated or those larger subsections comprising four adjacent segments may be rotated. Of course, when one rotates a segment or a sub section, he is by necessity rotating segments or subsections on the other three faces of the puzzle as well.

Those rotatable pieces that form the three corners of the puzzle will each have the information pertaining to three segments of the periodic table. Thus, a given small rotatable piece of the puzzle actually has three segments of (on three different faces) on it. For instance, segment I on face 1 is a part of that rotatable piece that also forms segment I on face 2 and segment I on face 4; see FIG. 1 for a depiction of this.

It also should be noted that a given piece does not necessarily have the same segment on it. For instance the piece that bears the information of segment I on face 3, will also bear the information for segment IX on face 2 and segment V on face 1. Again see FIG. 1. Similar reasoning for segment IX on face 3 which is the same piece for segment V on face 4 and segment IX on face 1.

By the same token, larger rotatable pieces (i.e. those that form segments I–IV on a given face) also have different segment information on different sides of the piece.

Successfully completing the puzzle involves returning all nine segments of each of the four faces into their correct relationship in the periodic table so that a the complete Zmaczynski triangular periodic table will be displayed on each face of the pyramid.

In the preferred format of the invention, all the segments will be of one background color. It is also possible to color code the segments on each face so that segments belonging to the same face will all have the same color. In that case, when the puzzle is successfully completed, each face of pyramid will have a single colored background in addition to the chemical information shown on the segments. However, color coding each face may make the puzzle too easy to solve so this embodiment would be for less advanced students.

Completing the puzzle along these lines will thus reinforce and help the student understand the concepts involved in the Zmaczynski presentation of the elements which presents the elements in a relationship to one another that is logical within the context of the Zmaczynski model.

The twist puzzle may be comprised of for example plastic or other materials that may be applicable given the manufacturing method that may be chosen. Decal labels with adhesive surfaces may be used to attach printed information bearing chemical symbols, name, etc. to each of the segments of the puzzle.

I claim:

1. A tetrahedral shaped twist puzzle apparatus based upon the Zmaczynski presentation of the periodic table which presentation comprises a series of rows of periodic elements, each row comprising a list of periodic elements; said puzzle apparatus comprising four faces arranged in three dimensional form so as to form a tetrahedron, each of said faces of equilateral triangular shape and of the same size and having three side edges, each of said faces comprising 9 triangular shaped segments, each of said segments displaying a portion of Zmaczynski presentation of the periodic table; a first said segments containing the first two of said series of rows of periodic elements, a second segment containing the third row of said series of rows; a third and fourth segment containing the fourth and fifth rows of said series of rows; and a fifth through ninth segment containing the sixth and seventh of said rows of said series of rows; said segments having a means of connection to allow said segments to rotate in relation to the remainder of the segments comprising the tetrahedron.

\* \* \* \* \*